US012656986B2

(12) United States Patent
Maruta

(10) Patent No.: US 12,656,986 B2
(45) Date of Patent: Jun. 16, 2026

(54) DISPLAY SYSTEM AND DISPLAY METHOD

(71) Applicant: Sharp NEC Display Solutions, Ltd., Tokyo (JP)

(72) Inventor: Taku Maruta, Tokyo (JP)

(73) Assignee: Sharp NEC Display Solutions, Ltd., Tokyo (JP)

( * ) Notice: Subject to any disclaimer, the term of this patent is extended or adjusted under 35 U.S.C. 154(b) by 0 days.

(21) Appl. No.: 18/793,097

(22) Filed: Aug. 2, 2024

(65) Prior Publication Data

US 2024/0393997 A1 Nov. 28, 2024

Related U.S. Application Data

(63) Continuation of application No. PCT/JP2022/005605, filed on Feb. 14, 2022.

(51) Int. Cl.
*G06F 3/14* (2006.01)
*G06F 3/01* (2006.01)
(52) U.S. Cl.
CPC ................. *G06F 3/14* (2013.01); *G06F 3/013* (2013.01)
(58) Field of Classification Search
CPC ............ G06F 3/14; G06F 3/013; G06Q 30/02
See application file for complete search history.

(56) References Cited

U.S. PATENT DOCUMENTS

| | | | |
|---|---|---|---|
| 2011/0209066 A1* | 8/2011 | Sakata | H04N 21/44218 |
| | | | 715/735 |
| 2011/0302117 A1* | 12/2011 | Pinckney | G06Q 30/02 |
| | | | 706/12 |
| 2016/0125048 A1 | 5/2016 | Hamada | |
| 2020/0026397 A1* | 1/2020 | Wohlstadter | G06F 3/0482 |

FOREIGN PATENT DOCUMENTS

| | | |
|---|---|---|
| JP | 2003-271084 A | 9/2003 |
| JP | 2011-139441 A | 7/2011 |
| JP | 2012-205112 A | 10/2012 |
| JP | 2013-109051 A | 6/2013 |
| JP | 2016-091535 A | 5/2016 |

OTHER PUBLICATIONS

International Search Report in PCT/JP2022/005605 dated May 10, 2022 with English translation.

* cited by examiner

*Primary Examiner* — Matthew A Eason
*Assistant Examiner* — Chayce R Bibbee
(74) *Attorney, Agent, or Firm* — McGinn IP Law Group, PLLC

(57) ABSTRACT
A display system includes a category determination unit configured to determine a category on the basis of a result of estimating attributes of a person included in an image captured within a visible range of a display screen of a display device that displays content. The display system also includes a display control unit configured to cause the display device to display a list of the content, which is generated according to the category based on a viewing tendency of the content.

9 Claims, 7 Drawing Sheets

Figure 1:
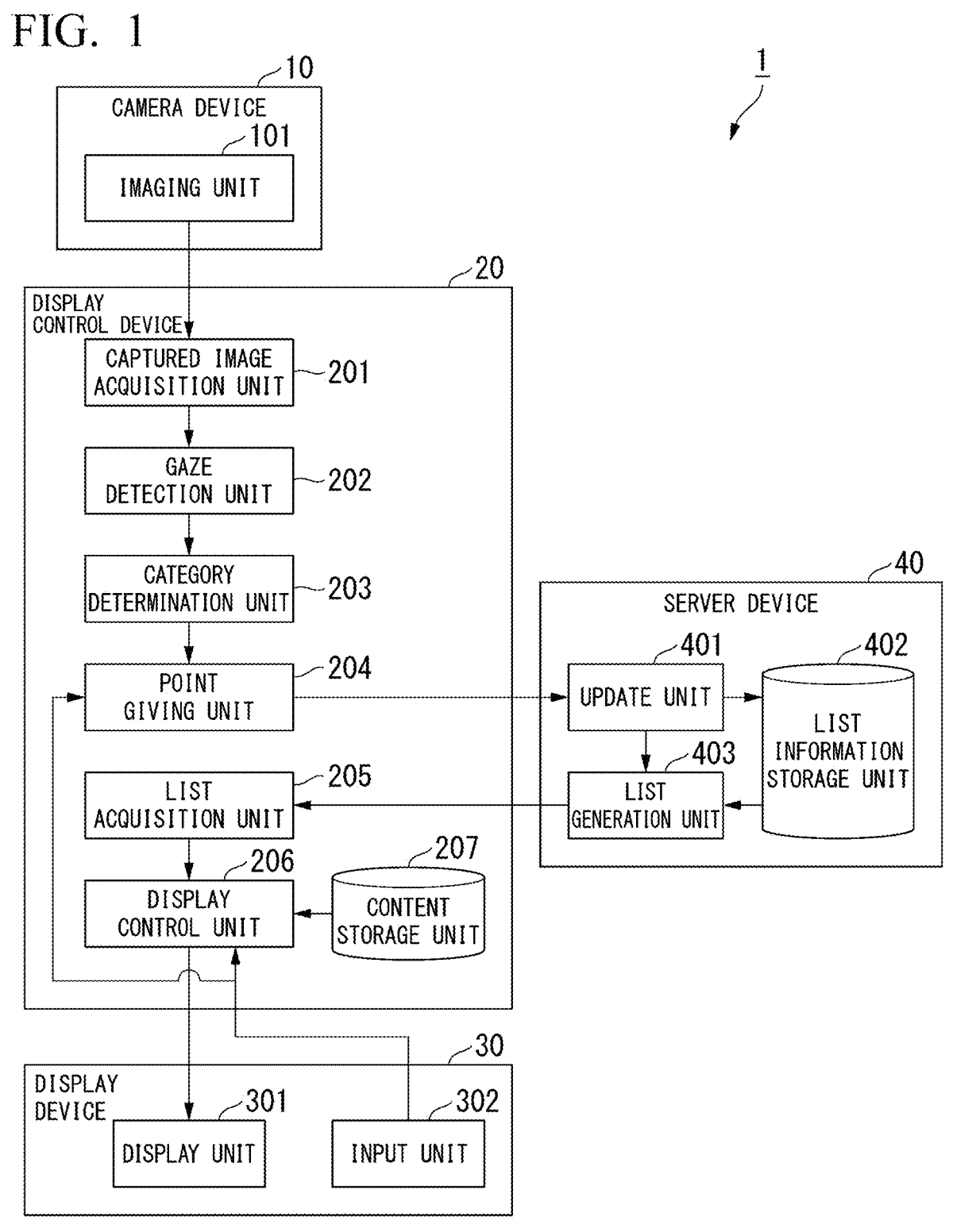

CAMERA DEVICE — 10

IMAGING UNIT — 101

DISPLAY CONTROL DEVICE — 20

CAPTURED IMAGE ACQUISITION UNIT — 201

GAZE DETECTION UNIT — 202

CATEGORY DETERMINATION UNIT — 203

POINT GIVING UNIT — 204

LIST ACQUISITION UNIT — 205

DISPLAY CONTROL UNIT — 206

CONTENT STORAGE UNIT — 207

SERVER DEVICE — 40

UPDATE UNIT — 401

LIST INFORMATION STORAGE UNIT — 402

LIST GENERATION UNIT — 403

DISPLAY DEVICE — 30

DISPLAY UNIT — 301

INPUT UNIT — 302

FIG. 2

| ADVERTISEMENT | CATEGORY | POINT |
|---|---|---|
| A | YOUNG WOMEN | 30 |
| A | OTHER WOMEN | 20 |
| A | YOUNG MEN | 10 |
| A | OTHER MEN | 10 |
| A | YOUNG COUPLES | 20 |
| A | OTHER COUPLES | 10 |
| A | YOUNG GROUPS | 20 |
| A | OTHER GROUPS | 10 |
| A | YOUNG FAMILIES | 10 |
| A | OTHER FAMILIES | 10 |
| A | UNKNOWN | 0 |
| ... | ... | ... |

FIG. 8

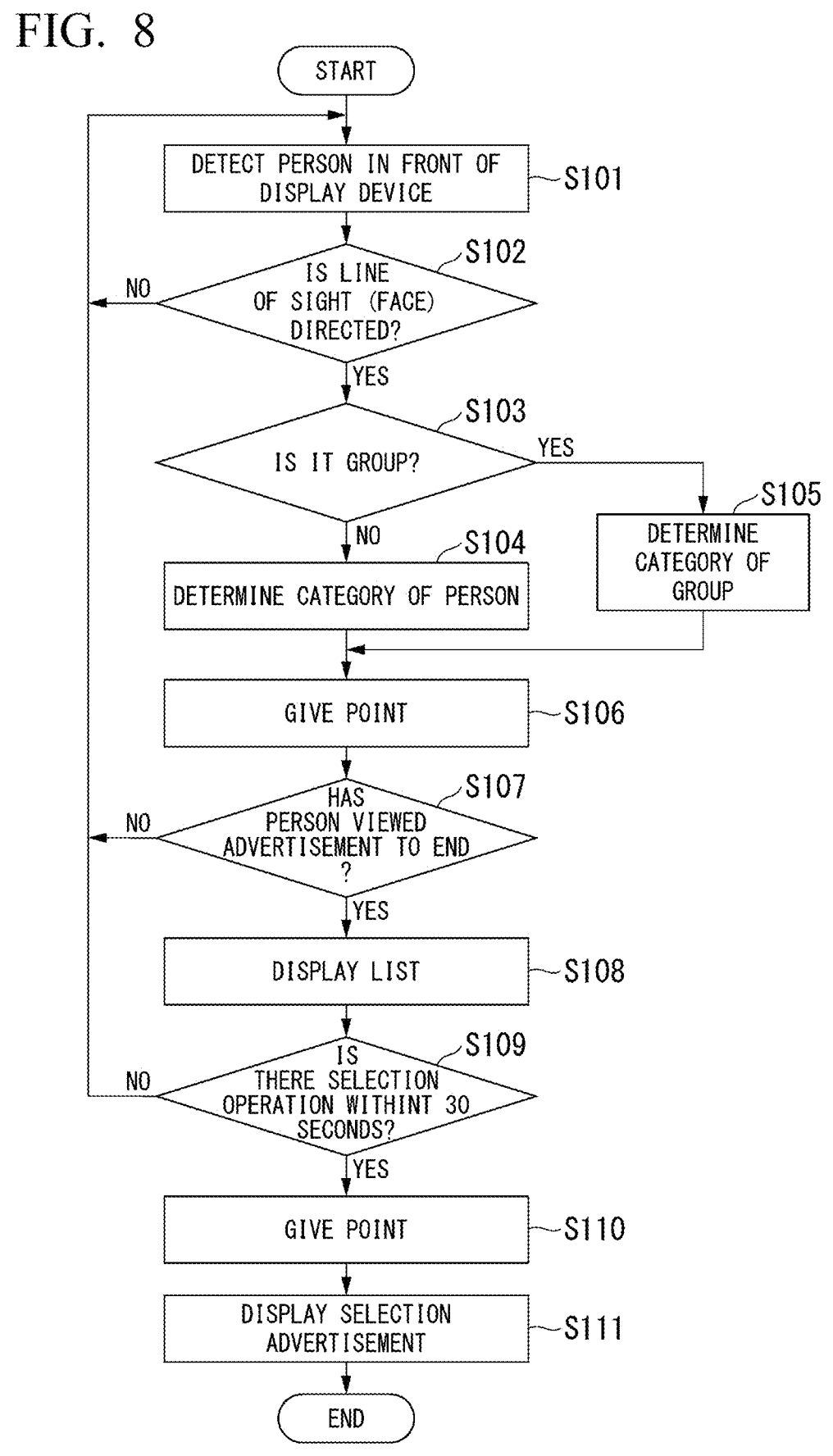

```
                    ┌─────────┐
                    │  START  │
                    └────┬────┘
                         │
      ┌──────────────────┤
      │         ┌─────────▼──────────┐
      │         │ DETECT PERSON IN FRONT OF │──S101
      │         │   DISPLAY DEVICE   │
      │         └─────────┬──────────┘
      │                   │
      │              S102 │
      │  NO      ╱────────────────╲
      ◄─────────┤    IS LINE       │
      │          ╲ OF SIGHT (FACE) ╱
      │          ╱   DIRECTED?     ╲
      │          ╲────────┬────────╱
      │               YES │
      │                   │          S103
      │          ╱────────────────╲     YES
      │         ┤    IS IT GROUP?  ├──────────────┐
      │          ╲────────┬────────╱              │
      │               NO  │   S104           S105 │
      │         ┌─────────▼──────────┐   ┌────────▼────────┐
      │         │ DETERMINE CATEGORY │   │    DETERMINE     │
      │         │    OF PERSON       │   │  CATEGORY OF     │
      │         └─────────┬──────────┘   │    GROUP         │
      │                   │              └────────┬────────┘
      │                   ◄───────────────────────┘
      │         ┌─────────▼──────────┐
      │         │     GIVE POINT     │──S106
      │         └─────────┬──────────┘
      │                   │          S107
      │  NO      ╱────────────────╲
      ◄─────────┤  HAS PERSON VIEWED│
      │          ╲ ADVERTISEMENT TO ╱
      │          ╱      END?        ╲
      │          ╲────────┬────────╱
      │               YES │
      │         ┌─────────▼──────────┐
      │         │    DISPLAY LIST    │──S108
      │         └─────────┬──────────┘
      │                   │          S109
      │  NO      ╱────────────────╲
      └─────────┤  IS THERE SELECTION│
                 ╲OPERATION WITHINT 30╱
                 ╱    SECONDS?        ╲
                 ╲────────┬──────────╱
                      YES │
                ┌─────────▼──────────┐
                │     GIVE POINT     │──S110
                └─────────┬──────────┘
                ┌─────────▼──────────┐
                │ DISPLAY SELECTION  │──S111
                │   ADVERTISEMENT    │
                └─────────┬──────────┘
                     ┌────▼────┐
                     │   END   │
                     └─────────┘
```

DISPLAY SYSTEM AND DISPLAY METHOD

TECHNICAL FIELD

The present invention relates to a display system and a display method.

BACKGROUND ART

One problem that occurs in large shopping malls is that it is difficult to attract customers who shop without a specific purpose. In addition, shoppers may not know the best way to walk around a shopping mall because of factors such as not being aware of trends. Therefore, attracting customers by displaying store advertisements using electronic sign-boards such as digital signage in shopping malls can be considered.

Patent Document 1 describes a technology in which the gender and age of a person near the front of a display device that broadcasts content of an advertisement are estimated, and second content is broadcast according to a result of the estimation.

However, in the technology described above, the displayed content may not necessarily be of interest to the person, and may not be a clue as to how to walk around a commercial facility such as a shopping mall.

CITATION LIST

Patent Literature

[Patent Literature 1]
Japanese Unexamined Patent Application, First Publication No. 2012-205112

SUMMARY OF INVENTION

Technical Problem

The problem to solve is that it is not possible to display a clue as to how to walk around a commercial facility through digital signage.

Solution to Problem

According to one aspect of the present invention, a display system includes a category determination unit configured to determine a category on the basis of a result of estimating attributes of a person included in an image captured within a visible range of a display screen of a display device that displays content, and a display control unit configured to cause the display device to display a list of the content, which is generated according to the category based on a viewing tendency of the content.

Moreover, according to another aspect of the present invention, a display method that is executed by a computer includes determining a category on the basis of a result of estimating attributes of a person included in an image captured within a visible range of a display screen of a display device that displays the content, and causing the display device to display a list of the content, which is generated according to the category based on a viewing tendency of the content.

Advantageous Effects of Invention

According to the present invention, it is possible to display a clue as to how to walk around a commercial facility through digital signage.

BRIEF DESCRIPTION OF DRAWINGS

FIG. 1 is a schematic block diagram which describes a configuration of a display system in an embodiment of the present invention.

FIG. 2 is a schematic diagram which shows a data structure and a data example of a point table stored by a server device.

FIG. 8 is a flowchart which describes an operation of display processing executed by the display system.

DESCRIPTION OF EMBODIMENTS

Figure 3:
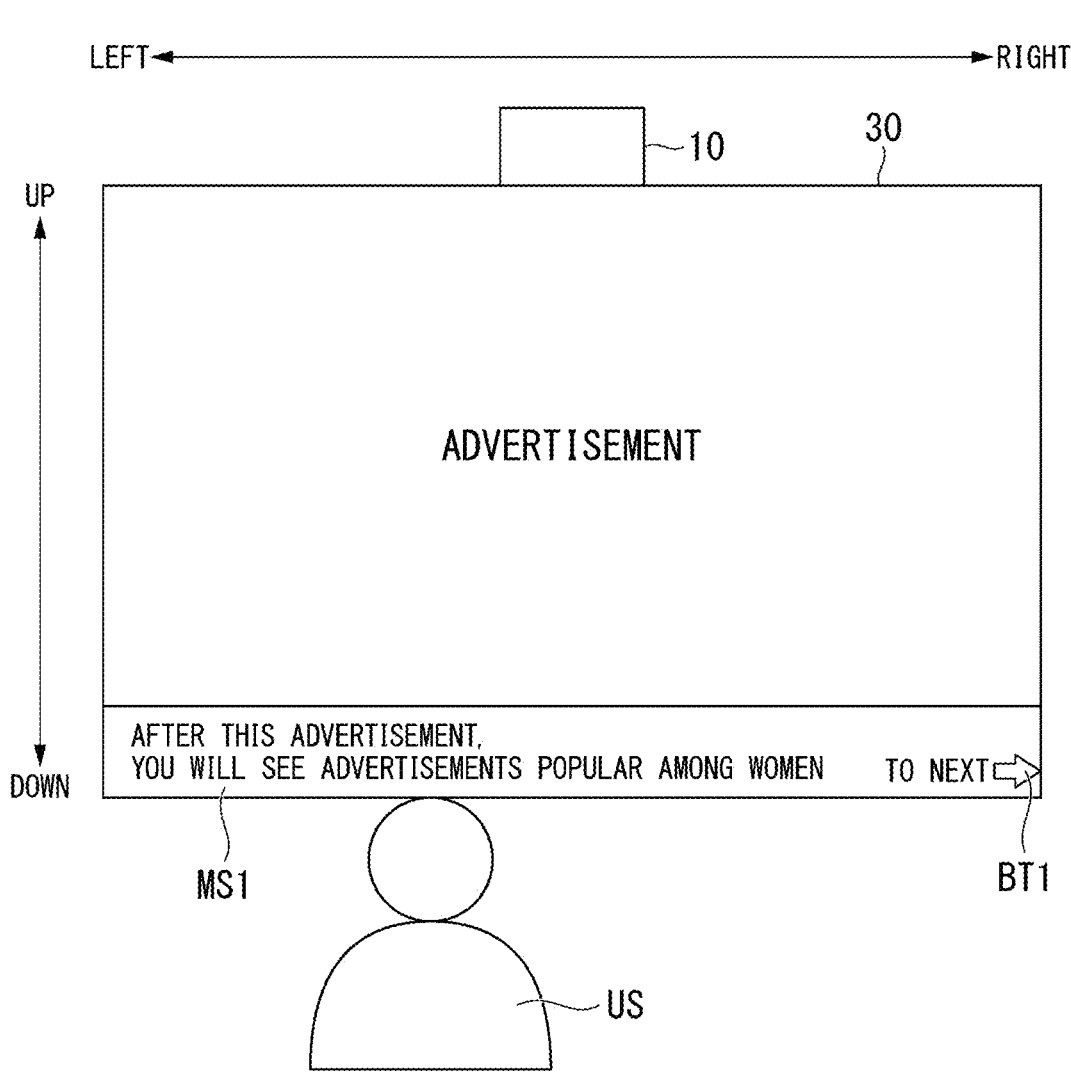
FIG. 3 is an image diagram which shows a display example of an advertisement displayed by a display device.

Hereinafter, an embodiment of the present invention will be described.

FIG. 1 is a schematic block diagram which describes a configuration of a display system in an embodiment of the present invention. In this embodiment, a display system 1 is a system that controls display of content displayed on an electronic signboard such as digital signage. Content is, for example, an advertisement, and may be a still image or a moving image, and may be an image having sound or may be an image without sound.

In FIG. 1, the display system 1 includes a camera device 10, a display control device 20, a display device 30, and a server device 40.

The camera device 10 and the display control device 20 are connected for communication via a wired or wireless local area network (LAN). In addition, the display control device 20 and the display device 30 are connected via a video cable that transmits video signals. Moreover, the display control device 20 and the server device 40 are connected for communication via a communication network such as the Internet.

In the example shown in FIG. 1, one camera device 10, one display control device 20, and one display device 30 are shown, but the present invention is not limited to this, and there may be a plurality of sets of combinations of the camera device 10, the display control device 20, and the display device 30.

The camera device 10 is installed near the display device 30 and captures an image of a person within a visible range of a display screen of the display device 30 (hereinafter also referred to as an effective range). The camera device 10 has an imaging unit 101. The imaging unit 101 captures an image of a person within a visible range of the display screen of the display device 30 at an arbitrary frame rate, and generates a captured image of the person.

The display control device 20 is a computer that controls the display of content displayed on the display device 30. For example, the display control device 20 outputs a video signal of content to the display device 30 and causes the display device 30 to display the content.

The display control device 20 includes a captured image acquisition unit 201, a gaze detection unit 202, a category determination unit 203, a point giving unit 204, a list acquisition unit 205, a display control unit 206, and a content storage unit 207.

The captured image acquisition unit 201 acquires a captured image from the camera device 10.

The gaze detection unit 202 estimates a gaze of each person within an effective range on the basis of the captured image, and determines whether a person within the effective range directs his or her gaze to the display screen of the display device 30 on the basis of the estimated gaze.

The category determination unit 203 determines a category on the basis of a result of estimating attributes of a person included in an image captured within a visible range of the display screen of the display device. Attributes are assigned to one person and include at least one of gender, age, and the like. For the attributes, for example, a combination of age and gender, such as "male in his 20s" or "female in her 30s," can be used.

A category is determined according to the attributes of a person to whom it is given. When there is only one person to whom a category is given, the category is determined according to the attributes of the person. Moreover, when there are a plurality of people to whom a category is given, a group to which the plurality of people belong is a target to which the category is given, and a category is determined according to the attributes of persons belonging to that group.

Examples of the category include "young man," "young woman," "family," "group," "couple," "friends," and the like. When the number of persons included in the image captured within the visible range of the display screen of the display device is one, and the attributes of that person are "male in his 20s," the category determination unit 203 determines the category as "young man," and when the attributes of the person are "female in her 20s," it reflects the category as "young woman." In addition, when there are a plurality of persons included in the image captured within the visible range of the display screen of the display device, the category determination unit 203 determines the category according to the attributes given to each of the plurality of persons. For example, when there are a plurality of persons who belong to a group, and the attributes of those persons are "male in his teens," "female in her teens," "male in his 40s," and "female in her 40s," the category determination unit 203 determines the category as "family" on the basis of these attributes. Here, because a group whose attributes include a combination of "male in his teens," "female in her teens," "male in his 40s," and "female in her 40s" is estimated to be a family, it is determined as a "family."

When there are a plurality of persons who belong to a group and their attributes are "male in his 30s," "female in her 30s," "male in his 40s," and "female in her 40s," the category is determined as a "group." Here, because a group whose attributes include a combination of "male in his 30s," "female in her 30s," "male in his 40s," and "female in her 40s" is estimated to be gathering of friends, co-workers, or the like, it is determined as a "group."

When there are a plurality of persons who belong to a group, and the attributes of each person are "female in her 20s," they are "friends." When there are two persons who belong to a group, and the attributes of the persons are "male in his 20s" and "female in her 20s," the category is a "couple." When there are a plurality of persons who belong to a group, and the attributes of these persons include "female in her 20s" and "female in her 30s," the category may be a category that corresponds to an upper-order concept, such as "female."

If the number of persons included in the captured image is one, the category determination unit 203 regards that person as one group and determines the category. When there are a plurality of persons included in the captured image, the category determination unit 203 regards the plurality of persons as one group and determines the category.

When a person within an effective range has directed his or her gaze to the display screen of the display device 30, the category determination unit 203 may estimate the attributes of the person on the basis of the captured image, and determine the category of the person on the basis of the estimated attributes.

The point giving unit 204 gives points for a category to which a person who has viewed content belongs, which is stored in the list information storage unit 402, on the basis of the person's viewing status of the content displayed on the display screen.

Regarding the viewing status, the point giving unit 204 need only be able to ascertain that the person is viewing the content, but may also determine that the person is viewing the content on the basis of, for example, the fact that the person is able to direct his or her gaze to the display screen of the display device 30. Moreover, the point giving unit 204 may determine that the person is viewing the content on the basis of the fact that it is detected that content is selected by the input unit 302 from a list displayed by the display device 30.

The point giving unit 204 gives a point for a category of a person within the effective range for an advertisement being displayed when the person has directed his or her gaze to the display screen of the display device 30. The point is data for generating a list of advertisements, which will be described below. Specifically, the point giving unit 204 transmits point giving information including identification information of an advertisement displayed by the display device 30, a category, and the number of points to give (for example, points according to the number of persons directing their gazes to the display screen) to the server device 40.

In addition, when an advertisement is selected by the input unit 302 from the list displayed by the display device 30, the point giving unit 204 gives points for categories of selected persons to the selected advertisement.

The list acquisition unit 205 requests list information indicating a list of advertisements corresponding to the determined category from the server device 40, and receives and acquires it from the server device 40.

The display control unit 206 controls display of content displayed on the display device 30. For example, the display control unit 206 reads content of an advertisement from the content storage unit 207 and outputs a video signal of the read content of the advertisement to the display device 30, thereby causing the display device 30 to display the content of the advertisement. Moreover, the display control unit 206 causes the display device 30 to display a list of the content, generated according to a category based on a viewing tendency of the content. The viewing tendency can be estimated on the basis of whether the person has directed his or her gaze while the content was being displayed on the display device 30, whether an operation input has been made to select content to be viewed, and the like.

After a person within an effective range in which the person can visibly recognize the display screen of the display device 30 has viewed an advertisement to the end, the display control unit 206 causes the display device 30 to display a list of content (for example, advertisements) in accordance with a category of the person. The list of content is generated on the basis of points given for each category. At this time, the display control unit 206 causes a list of advertisements corresponding to the determined category to be displayed in the first area of the display screen of the display device 30, and causes a list of advertisements corresponding to an upper-order category of the category to be displayed in the second area of the display screen of the display device 30. Moreover, the display control unit 206 causes the display device 30 to display a list of recommended advertisements along with the list of advertisements corresponding to the determined category. Furthermore, when an advertisement is selected by the input unit 302 from the list displayed by the display device 30, the display control unit 206 causes the display device 30 to display content of the selected advertisement.

The content storage unit 207 stores the content of each advertisement displayed on the display device 30.

The display control device 20 may be a computer. In that case, functions of the captured image acquisition unit 201, the gaze detection unit 202, the category determination unit 203, the point giving unit 204, the list acquisition unit 205, and the display control unit 206 may be realized by using dedicated electronic circuits. In addition, a central processing unit (CPU) provided in the display control device 20 may realize these functions by reading software for realizing these functions from a storage device and executing the software.

The display device 30 is installed within a facility. Examples of the facility may include a plurality of places for walking around, such as a complex commercial facility, a shopping mall, a public facility, a department store, and the like. The place for walking around may be a store, a service provision place, a tourist spot, or the like.

The display device 30 is installed, for example, at an entrance of a shopping mall, and displays content for an advertisement on the display screen thereof. The displayed content includes content related to one of a plurality of places for walking around within the facility. Since the content related to the places for walking around is generated as a list according to a category and is displayed on the display device 30, a viewer can view content related to a place for walking around that is related to his or her category on the basis of this list. Viewers can use this content as a reference to consider places for walking around within the facility.

The display device 30 is, for example, digital signage. The display device 30 has a display unit 301 and an input unit 302.

The display unit 301 has a display screen. The display unit 301 receives a video signal from the display control device 20 and displays the input video signal on the display screen. The display unit 301 may be a projector, a liquid crystal display device, or an organic electro-luminescence (EL) display device.

The input unit 302 is, for example, a touch panel installed on the display screen of the display unit 301, and receives an input. For example, the input unit 302 receives a selection input of an advertisement from the list displayed by the display unit 301. The input unit 302 may be an input device other than a touch panel as long as it can receive operation details from a person.

The server device 40 is a server that collectively controls the display system 1. The server device 40 includes an update unit 401, a list information storage unit 402, and a list generation unit 403.

The update unit 401 receives point giving information from the display control device 20, and updates a point table stored by the list information storage unit 402 on the basis of the received point giving information. For example, the update unit 401 adds points for a category indicated by the point giving information to an advertisement indicated by the point giving information.

The list information storage unit 402 stores a point table indicating points for each category with respect to each piece of content. That is, the list information storage unit 402 stores points given for categories for each piece of content.

The list generation unit 403 receives a request for list information from the display control device 20, generates a list of advertisements on the basis of the point table for a category indicated by the received request, and transmits list information indicating the generated list to the display control device 20. The list generated here is a list of content related to places for walking around according to the category.

The content storage unit 207 and the list information storage unit 402 described above are configured by, for example, storage media such as a hard disk drive (HDD), a flash memory, and an electrically erasable programmable read only memory (EEPROM), a random access read/write memory (RAM), and a read only memory (ROM), or any combination of these storage media.

The content storage unit 207 and the list information storage unit 402 can use, for example, non-volatile memory.

FIG. 2 is a schematic diagram which shows a data structure and a data example of the point table stored by the server device 40.

As shown in FIG. 2, the point table stores advertisement, category, and point items in association with each other. An advertisement item is identification information of an advertisement. A point item is data used when lists by category are aggregated. In the shown example, there are 11 patterns in a category item, such as young women, other women, young men, other men, young couples, other couples, young groups, other groups, young families, and other families, and an unknown category. Among these, young women, other women, young men, and other men are categories of a person. On the other hand, young couples, other couples, young groups, other groups, young families, and other families are categories of a group. An unknown category indicates that an item does not fall into any of the categories listed above. Note that it is assumed in the example shown in FIG. 2 that the display device 30 be installed in a shopping mall targeting young people, and ages are classified into "young" and "other," but a method of classifying categories is not limited to this, and setting can be changed as appropriate depending on a facility where the display device 30 is installed.

In the shown example, "30" points for a category "young women," "20" points for a category "other women," "10" points for a category "young men," "10" points for a category "other men," "20" points for a category "young couples," "10" points for a category "other couples," "20" points for a category "young groups," "10" points for a category "other groups," "10" points for a category "young families," "10" points for a category "other families," and a "0" point for a category "unknown" are given to an advertisement "A."

Note that a period for which the point table holds points, that is, a period for aggregating points to generate a list, is, for example, a relatively long period of time, such as one year. Moreover, the server device 40 may collect points from a plurality of display control devices 20. As a result, a parameter can be increased at the time of aggregating points, so that it is possible to temporarily eliminate bias such as an increase in points of some advertisements and level them out.

FIG. 3 is an image diagram which shows a display example of an advertisement displayed by the display device.

In the example shown in FIG. 1, the camera device 10 is installed above the display device 30 and captures an image of an effective range where the display screen of the display device 30 is visible.

The display control unit 206 of the display control device 20 normally causes the content of an advertisement to be displayed on the entire display screen of the display device 30. For example, the display control unit 206 periodically causes the content of a plurality of preset default advertisements to be displayed. When a person US who is within the effective range of viewing the display screen of the display device 30 directs his or her gaze to the display screen while the content of an advertisement is displayed, the display control unit 206 causes a guidance to display a list of advertisements according to a category of that person US after the advertisement ends "After this advertisement, you can see advertisements that are popular among women" MS1 and an operation button BT1 for transitioning to a page displaying the list to be displayed at a bottom of the display screen. Note that the guidance to display the list after the advertisement ends may be displayed when a person is detected within the effective range. In this case, the category of a person is not included in the guidance, and the guidance is set to, for example, "after this advertisement, you can view popular advertisements," or the like. The display control unit 206 causes a list of advertisements corresponding to the category of the person US to be displayed on the display device 30 after the content of an advertisement being displayed ends or when the operation button BT1 receives an input.

Figure 4:
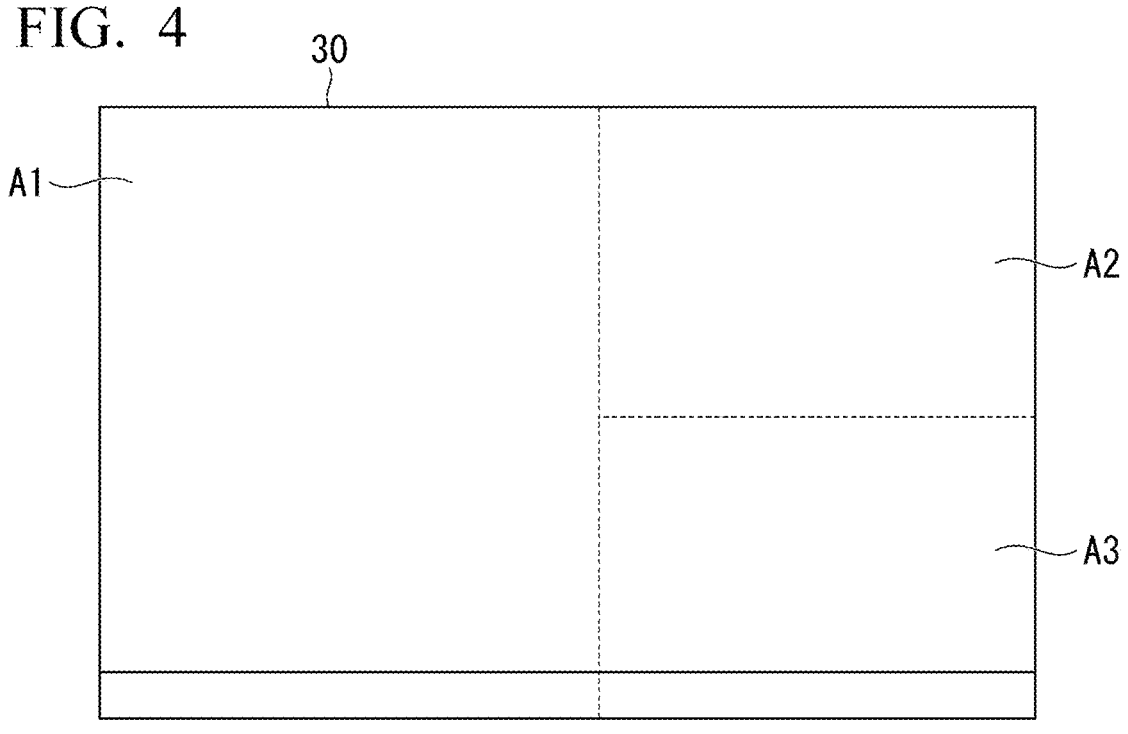
FIG. 4 is a diagram which shows a display area of each list displayed by the display device.

FIG. 4 is a diagram which shows a display area of each list displayed by the display device.

The display control unit 206 of the display control device 20 divides the display screen of the display device 30 into three display areas (a first area A1 with the largest display area, a second area A2 with a smaller display area than the first area A1, and a third area A3 with a smaller display area than the first area A1), and displays a list of different categories in each display area.

Figure 5:
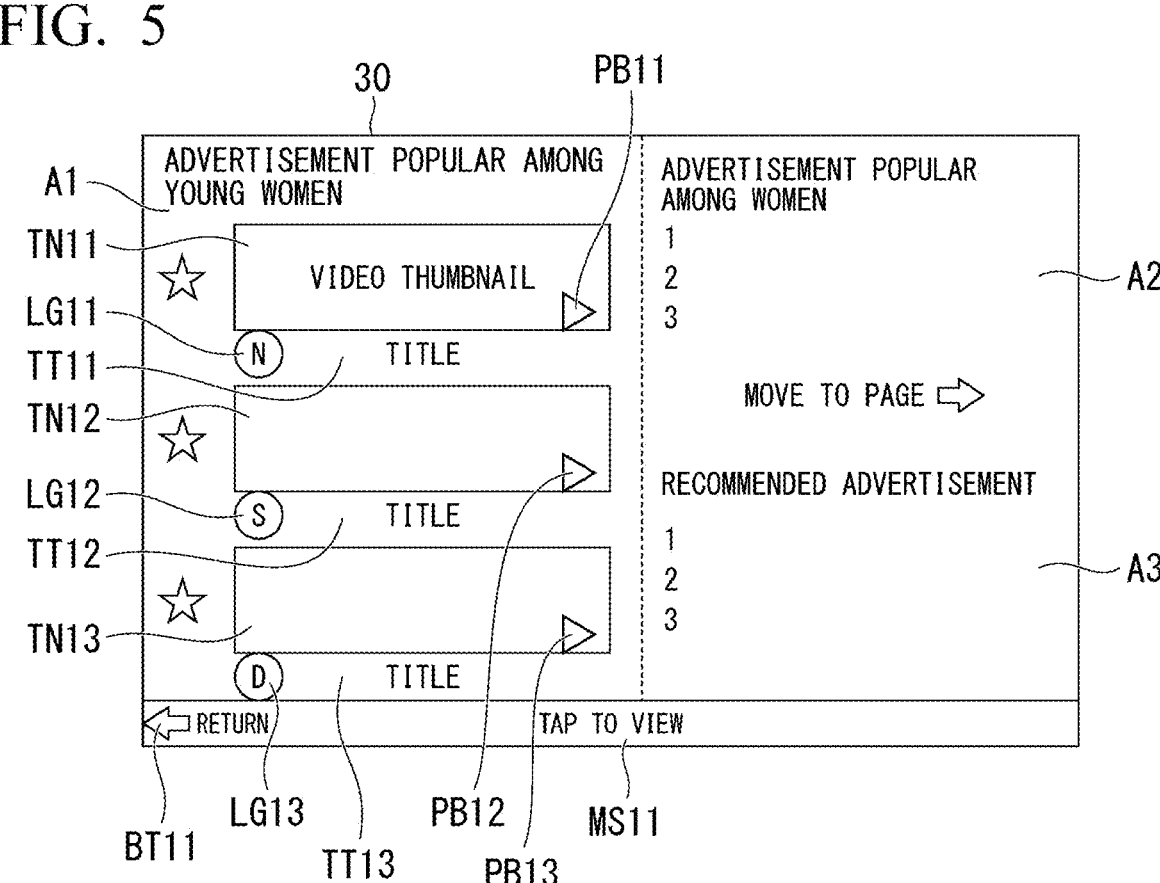
FIG. 5 is an image diagram which shows a display example of a list displayed by the display device.

FIG. 5 is an image diagram which shows a display example of a list displayed by the display device.

FIG. 5 is an example of a display when a person directing his or her gaze to the display screen of the display device 30 is a young woman.

The display control unit 206 of the display control device 20 displays a list of advertisements for the category of a person "young women" in the first area A1 with the largest display area. The list of advertisements is a ranking in descending order of points for the category.

The display control unit 206 displays advertisement video thumbnails TN11 to TN13, logos LG11 to LG13, titles TT11 to TT13, and play buttons PB11 to PB13 of first to third advertisements in descending order of points for the category "young women" in the first area A1. A video thumbnail is a thumbnail image of the content of an advertisement, and may be a moving image or a still image. A logo is a logo of a product, a store, or the like serving as a target of the advertisement. A title is, for example, a title of the advertisement of a product name or a store name. A play button is a tappable operation button for displaying the content of a corresponding advertisement.

Furthermore, the display control unit 206 displays a list of advertisements for an upper-order category "women" of the category "young women" in the second area A2. Specifically, the display control unit 206 displays titles of the first to third advertisements in the second area A2 in descending order of points for the upper-order category "women." Points for "women" are a sum of points for categories "young women" and "other women." In addition, in this example, an upper-order category of a category that is a combination of attributes "gender" and "age" is "gender," but the upper-order category may be anything that is an upper-order of a determined category, and may also be "age." In this example, the upper-order category may be "young."

In addition, the display control unit 206 displays a list of recommended advertisements that does not depend on the category of a person in the third area A3. The recommended advertisement is a recommended advertisement according to a time zone or date, and is set in advance according to the time zone or date. For example, recommended advertisements are advertisements for recommended cafes, food codes, souvenir shops, and the like recommended by a shopping mall. The display control unit 206 displays titles of first to third recommended advertisements corresponding to a current time zone and date in the third area A3.

In addition, the display control unit 206 causes the display screen of the display device 30 to display a guidance "tap to view" MS11 that allows advertisements in the list to be displayed by tapping, and a back button BT11 for returning to an original advertisement.

Figure 6:
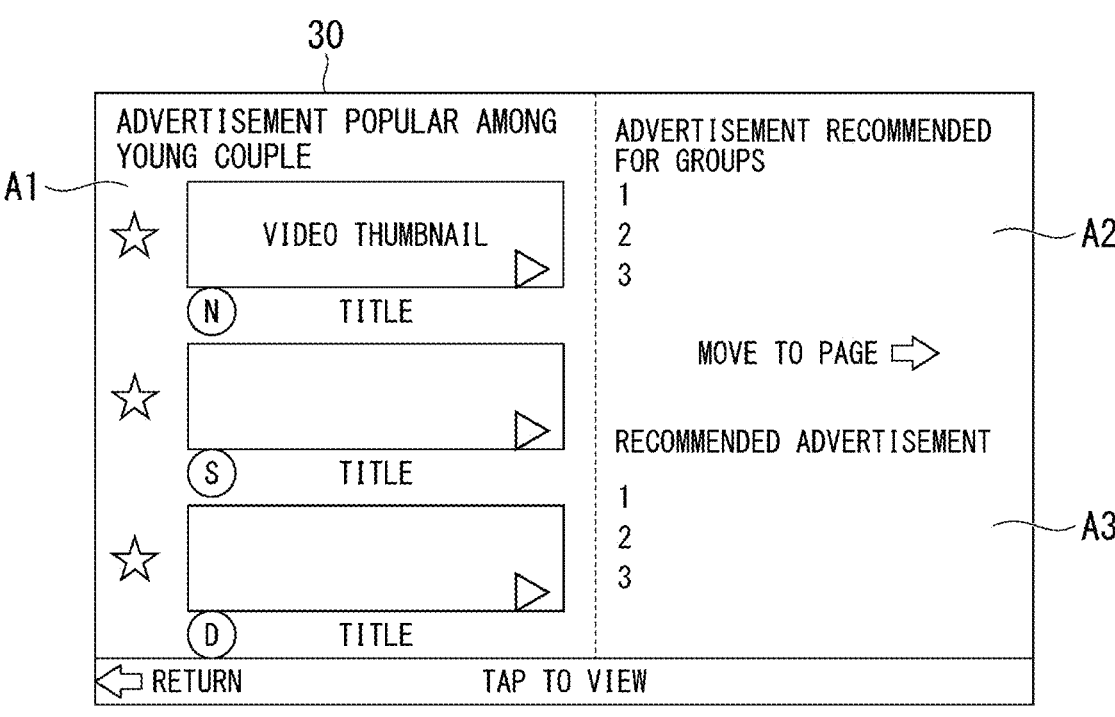
FIG. 6 is an image diagram which shows another display example of the list displayed by the display device.

FIG. 6 is an image diagram which shows another display example of the list displayed by the display device.

FIG. 6 is an example of a display when the person directing his or her gaze to the display screen of the display device 30 is a pair of young male and female.

When there are a plurality of persons directing his or her gaze to the display screen of the display device 30, the category determination unit 203 of the display control device 20 determines whether they belong to a group on the basis of a distance between the persons. For example, the category determination unit 203 determines that a plurality of persons belong to one group when a distance between the plurality of persons is within a predetermined range. Then, the category determination unit 203 determines the category of a group on the basis of attributes of each of persons belonging to the group. In this example, the category determination unit 203 determines the category to be "young couple" because the persons in the group are a pair of young male and female.

The display control unit 206 of the display control device 20 causes a list of advertisements for the determined category "young couple" to be displayed in the first area A1 with the largest display area. A display method of the list of advertisements in the first area A1 is the same as in the example shown in FIG. 5, so that a description thereof will be omitted.

In addition, the display control unit 206 causes a list of advertisements (titles of the first to third advertisements)

recommended for the group that is an upper-order category of the category "young couple" to be displayed in the second area A2. The list of advertisements recommended for the group is set in advance. In this example, the display control unit 206 displays the advertisements recommended for the group in the second area A2, but the present invention is not limited to this, and may cause a list of advertisements for other upper-order categories of the determined category (in this example, "couple" or "young") to be displayed in the second area A2.

Other displays shown in FIG. 6 are the same as the display example shown in FIG. 5, and therefore their explanations will be omitted.

Figure 7:
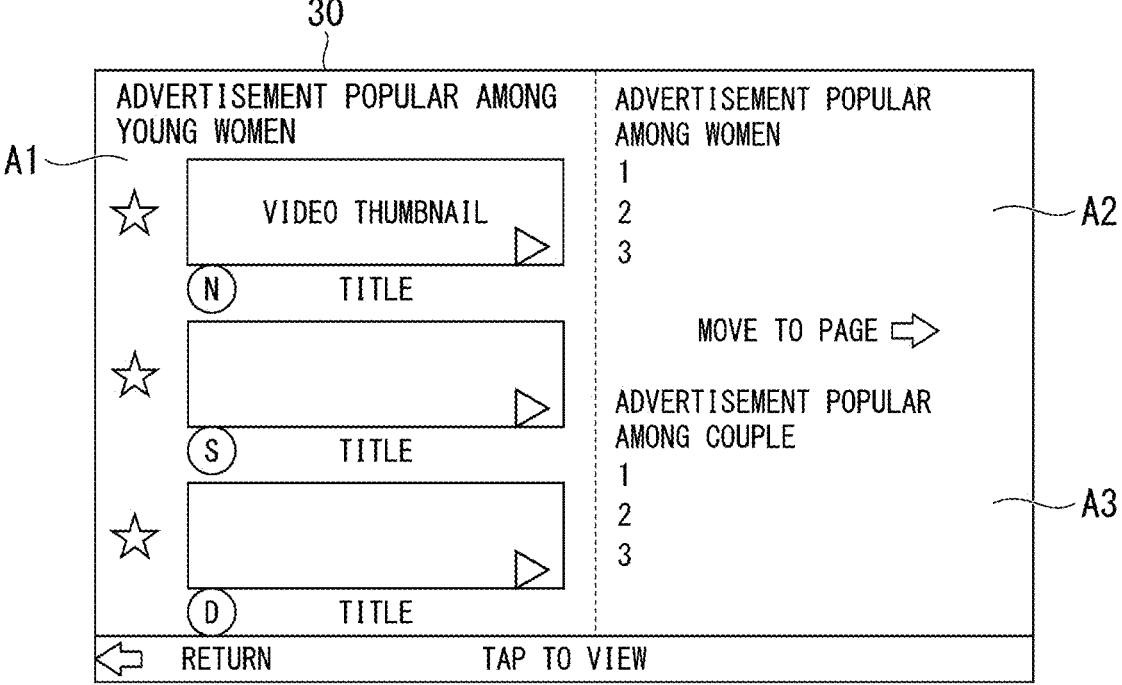
FIG. 7 is an image diagram which shows still another display example of the list displayed by the display device.

FIG. 7 is an image diagram which shows another display example of the list displayed by the display device.

FIG. 7 is another display example when the person directing his or her gaze to the display screen of the display device 30 is a young woman.

In the display example shown in FIG. 5, a list of recommended advertisements is displayed in the third area A3, but the example shown in FIG. 7 differs in that a list of advertisements for categories that are estimated to be related to the determined category is displayed. Categories that are estimated to be related to each category are set in advance.

In the example shown in FIG. 7, the display control unit 206 causes a list of advertisements for the category "couple" that is estimated to be related to the category of a person "young women" (the titles of the first to third advertisements) to be displayed in the third area A3.

Other displays shown in FIG. 7 are the same as the display example shown in FIG. 5, so that their explanation will be omitted.

In the display example described above, the display control unit 206 causes only the titles of advertisements to be displayed in the second area A2 and the third area A3, but when the display area is large enough, the display control unit 206 may cause a video thumbnail, a logo, and a play button to be displayed.

Next, an operation of this display system 1 will be described.

FIG. 8 is a flowchart which describes an operation of display processing executed by the display system.

When the display control device 20 detects a person in front of the display screen of the display device 30 while the content of an advertisement is displayed (step S101), the display control device 20 executes the processing shown in FIG. 8. For example, the display control device 20 detects that there is a person in front of the display screen when the captured image acquisition unit 201 detects a person from a captured image acquired from the camera device 10.

The gaze detection unit 202 of the display control device 20 determines whether the person has directed his or her gaze (face) to the display screen of the display device 30 on the basis of the captured image acquired from the camera device 10 by the captured image acquisition unit 201 (step S102). When the person has not directed his or her gaze to the display screen (NO in step S102), the processing returns to step S101.

On the other hand, when the person has directed his or her gaze to the display screen (YES in step S102), the category determination unit 203 determines whether there is a group on the basis of the number of persons who have directed their gaze to the display screen (step S103). Specifically, the category determination unit 203 determines that there is a group when the number of persons who have directed their gaze to the display screen is two or more and a distance between these persons is within a predetermined range.

When the category determination unit 203 determines that there is not a group (NO in step S103), the category determination unit 203 determines the category of a person having directed his or her gaze to the display screen on the basis of the attributes of the person (step S104).

On the other hand, when the category determination unit 203 determines that there is a group (YES in step S103), the category determination unit 203 determines a category of the group on the basis of the attributes of each person belonging to the group (step S105).

Note that the category determination unit 203 sets a category to "unknown" in all cases where it does not fall under either the category of a person or the category of a group.

Subsequently, the point giving unit 204 gives points for the determined category to the advertisement which is currently displayed by the display device 30 (step S106). Specifically, the point giving unit 204 transmits point giving information including identification information of the advertisement displayed by the display device 30, the determined category, and the number of points to be given to the server device 40. The update unit 401 of the server device 40 receives the point giving information from the display control device 20, and updates the point table stored by the list information storage unit 402 on the basis of the received point giving information.

Next, the list acquisition unit 205 determines whether the person who has directed his or her gaze to the display screen has viewed the advertisement to the end (step S107). For example, when the gaze of the person is directed to the display screen of the display device 30 at the time when the content of the advertisement displayed on the display device 30 has ended, the list acquisition unit 205 determines that the person has viewed the advertisement to the end, and when it is not directed to the display screen, the list acquisition unit determines that the person has not viewed the advertisement to the end. When the person has not viewed the advertisement to the end (NO in step S107), the processing returns to step S101.

On the other hand, when the person has viewed the advertisement to the end (Yes in step S107), the display control unit 206 causes the display unit 301 of the display device 30 to display a list of advertisements for the determined category (step S108). Details of list display processing that displays the list of advertisements will be described below.

Next, the display control unit 206 determines whether there has been a selection operation in which the person selects an advertisement from the list within 30 seconds after the list of advertisements is displayed (step S109). For example, the display control unit 206 determines that there has been a selection operation when the input unit 302 of the display device 30 receives a selection input of an advertisement from the list. When there is no selection operation within 30 seconds (NO in step S109), the display control unit 206 causes the display unit 301 of the display device 30 to display content of a default advertisement, and returns to the processing of step S101.

On the other hand, when there is a selection operation within 30 seconds (YES in step S109), the point giving unit 204 gives points for the determined category to the selected advertisement (step S110).

Then, the display control unit 206 causes the display unit 301 of the display device 30 to display the content of the selected advertisement (step S111). After that, the processing ends.

Figure 9:
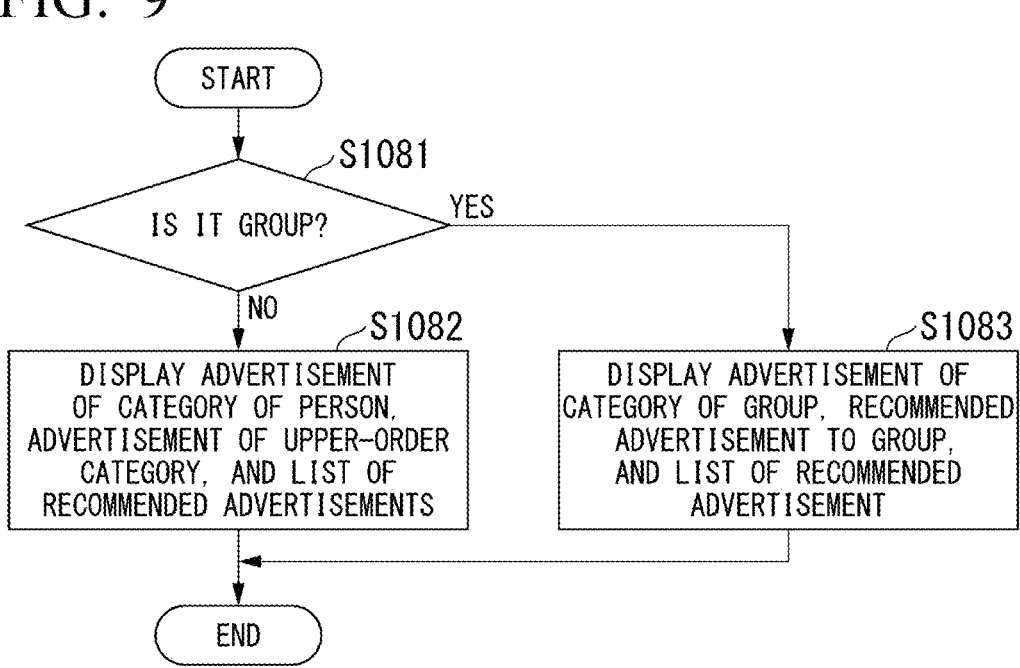
FIG. 9 is a flowchart which describes an operation of list display processing executed by the display system.

FIG. 9 is a flowchart which describes the operation of list display processing executed by the display system. Processing shown in FIG. 9 corresponds to the processing in step S108 described above.

First, the list acquisition unit 205 determines whether the determined category is the category of a group (step S1081).

When the determined category is the category of a person (NO in step S1081), the list acquisition unit 205 requests the server device 40 for list information on the determined category, an upper-order category thereof, and a recommended advertisement. The list generation unit 403 of the server device 40 generates a list of advertisements on the basis of the received request, and transmits list information indicating the generated list to the display control device 20. At this time, the list generation unit 403 includes a list of recommended advertisements corresponding to a time zone and date when the request is received in the list information. The list acquisition unit 205 receives the list information from the server device 40. Then, the display control unit 206 displays the list of advertisements for the determined category in the first area A1, displays the list of advertisements for the upper-order category of the determined category in the second area A2, and displays the list of recommended advertisements in the third area A3 on the basis of the received list information (step S1082). After that, the processing ends.

On the other hand, when the determined category is the category of a group (YES in step S1081), the list acquisition unit 205 requests the server device 40 for list information on the determined category, a group, and a recommended advertisement. The list generation unit 403 of the server device 40 generates a list of an advertisement on the basis of the received request, and transmits list information indicating the generated list to the display control device 20. At this time, the list generation unit 403 causes a list of recommended advertisements corresponding to a time zone and date when the request is received to be included in the list information. The list acquisition unit 205 receives the list information from the server device 40. Then, the display control unit 206 displays the list of advertisements for the determined category in the first area A1, displays the list of advertisements recommended for the group in the second area A2, and displays the list of recommended advertisements in the third area A3 on the basis of the received list information (step S1083). After that, the processing ends.

In this manner, the display system 1 according to the present embodiment has a display control unit 206 that causes the display device 30 to display the content of an advertisement, and the category determination unit 203 that estimates the attributes of a person who is within the visible effective range of the display screen of the display device 30, and determines the category of the person on the basis of the estimated attributes, and the display control unit 206 causes the display device 30 to display a list of advertisements according to the determined category.

With such a configuration, it is possible to display a list of advertisements according to the category of a person who is within the visible effective range of the display screen of the display device 30 to the person. As a result, the person can know the content, that is, a trend, that people in the same category (for example, age, gender, or the like) as himself or herself are interested in. Therefore, it can be expected to have an effect of broadening a range of interests of people who are shopping without a purpose at shopping malls and the like, and increasing their purchasing desire. Additionally, for advertisers, it can be expected to have an effect of expanding a range of customers to attract. Therefore, according to the present display system 1, the display device 30 installed in a commercial facility such as a shopping mall can display a clue as to how to walk around the commercial facility.

In addition, when there is a group within the effective range, the category determination unit 203 determines the category of the group on the basis of the attributes of people belonging to the group. As a result, it is possible to display, for example, a list of advertisements according to a group, such as couples, groups, families, friends, and children.

Furthermore, the display control unit 206 causes a list of advertisements corresponding to the determined category to be displayed in the first area of the display screen, and causes a list of advertisements corresponding to an upper-order category of the category to be displayed in the second area of the display screen. As a result, even if the determined category does not match the person, it is possible to display a list of advertisements suitable for the person by displaying the list for the upper-order category.

In addition, the display system 1 also includes the gaze detection unit 202 that detects that a person has directed his or her gaze to the display screen, and the category determination unit 203 determines the category when a person has directed his or her gaze to the display screen. As a result, a list of advertisements can be presented to the person who is viewing the display screen of the display device 30.

In addition, the display system 1 includes the point giving unit 204 that gives points for a category of the person to an advertisement which is being displayed when the person has directed his or her gaze to the display screen, and a list of advertisements is generated on the basis of the given points. As a result, points can be given to an advertisement that a person belonging to the category has actually viewed, so that it is possible to generate a list of advertisements that the person of the category has actually shown interest in.

In addition, it also includes the input unit 302 that receives a selection input of an advertisement from the displayed list, and when an advertisement is selected by the input unit 302, the display control unit 206 causes the display device 30 to display the content of the selected advertisement. As a result, a person who has viewed the list can view the content of an advertisement which is of interest from the list.

Moreover, when an advertisement is selected by the input unit 302, the point giving unit 204 is provided which gives points for the category of a person to the selected advertisement, and a list is generated on the basis of the given points. As a result, points can be given to an advertisement that a person belonging to the category has actually viewed, so that it is possible to generate a list of advertisements that the person of the category has actually shown interest in.

Moreover, the display control unit 206 causes the display device 30 to display a list of recommended advertisements along with a list of advertisements corresponding to the category of a person. As a result, the display device 30 installed in a commercial facility such as a shopping mall can display a list of advertisements for products (for example, campaign products), stores, and the like recommended at that commercial facility along with a list according to the category of a person. Therefore, it can be expected to have the effect of broadening the range of interests of persons who are shopping without a purpose at shopping malls and the like, and increasing their purchasing desire.

Figure 10:
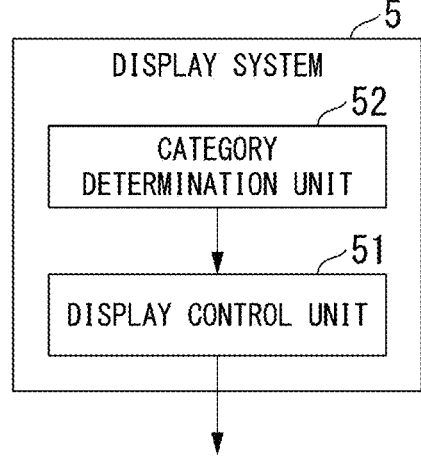
FIG. 10 is a diagram which shows a basic configuration of the display system according to the present invention.

FIG. 10 is a diagram which shows a basic configuration of the display system according to the present invention.

The display system 5 according to the present invention includes a display control unit 51 and a category determination unit 52.

The display control unit 51 causes the display device to display the content of an advertisement. Moreover, the display control unit 51 causes the display device to display a list of the content, which is a list of the content based on a viewing tendency of the content, and is generated according to a category determined by the category determination unit 52.

The category determination unit 52 estimates the attributes of a person included in an image captured within the visible range of the display screen of a display device that displays content, and determines a category for a group to which the person belongs on the basis of the estimated attributes.

In addition, the position may be detected by recording programs for realizing each function of the camera device, the display control device, the display device, and the server device in FIG. 1 on a computer-readable recording medium, and reading and executing the programs recorded on this recording medium using the computer system. Note that the "computer system" herein includes an OS and hardware such as peripheral devices.

Additionally, the "computer system" includes a homepage providing environment (or a display environment) when a WWW system is used.

Furthermore, the term "computer-readable recording medium" refers to a portable medium such as a flexible disk, a magneto-optical disc, an ROM, or a CD-ROM, or a storage device such as a hard disk embedded in the computer system. Furthermore, the term "computer-readable recording medium" includes a medium that holds a program for a certain period of time, such as volatile memory inside the computer system that serves as a server or a client. Moreover, the program described above may be a program for realizing a part of the functions described above, or may be a program that can realize the functions described above in combination with a program already recorded in the computer system. In addition, the program described above may be stored in a predetermined server, and the program may be distributed (downloaded, or the like) via a communication line in response to a request from another device.

Although the embodiments of the present invention have been described above in detail with reference to the drawings, a specific configuration is not limited to these embodiments, and includes designs within a range not departing from the gist of the present invention.

For example, in the embodiment described above, the display control unit 206 displays a list after the content of an advertisement ends, but a timing to display the list is not limited to this, and it may be, for example, displayed at another timing such as when the category of a person is estimated. If the display control unit 206 displays a list of an advertisement when the category of a person is estimated, it may display the list over the advertisement (for example, in the lower right area, or the like).

REFERENCE SIGNS LIST 1, 5 Display system
10 Camera device
101 Imaging unit
20 Display control device
201 Captured image acquisition unit
202 Gaze detection unit
203, 52 Category determination unit
204 Point giving unit
205 List acquisition unit
206, 51 Display control unit 207 Content storage unit
30 Display device
301 Display unit
302 Input unit
40 Server device
401 Update unit
402 List information storage unit
403 List generation unit

What is claimed is:

1. A display system comprising:
a gaze detection unit configured to detect that a person has directed his or her gaze to a display screen of a display device that displays content;
a category determination unit configured to determine, when the person has directed his or her gaze to the display screen, one or more categories on the basis of a result of estimating attributes of one or more persons included in an image captured within a visible range of the display screen of the display device that displays content;
a list information storage unit configured to store a point table which shows each identification information of a respective contents, each category and points given which are associated among each other;
a point giving unit configured to give points for a category to which a person who has viewed the content belongs, which is stored in the list information storage unit, on the basis of a viewing status of the content displayed on the display screen by the person, the point giving unit being configured to set, based on a fact that the gaze of the person is directed at the display screen, content being displayed when the gaze is directed as a target, and to give points for the category;
a list generation unit configured to generate a list of the content on the basis of the point tables for the category stored in the list information storage unit; and
a display control unit configured to cause the display device to display a list of the content, which is generated according to the category based on a viewing tendency of the content.

2. The display system according to claim 1, wherein the display control unit is configured to cause the display device to display a list of content corresponding to the category in a first area of the display screen of the display device, and to cause the display device to display a list of content corresponding to an upper-order category of the category in a second area of the display screen of the display device.

3. The display system according to claim 1, further comprising:
an input unit configured to receive a selection input of content from the displayed list,
wherein the display control unit is configured to cause the display device to display the selected content on the display device when content is selected by the input unit.

4. The display system according to claim 3, wherein the point giving unit is conjured to set the selected content as a target and gives points for the category in case that content is selected by the input unit.

5. The display system according to claim 1, wherein the display control unit is configured to cause the display device to display a list of recommended content as well as a list of content according to the category.

6. The display system according to claim 1, wherein the display device is installed within a facility, wherein the content includes content related to one of a plurality of places for walking around within the facility, and wherein the list is a list of content related to a place for walking around according to the category.

7. The display system according to claim 1, further comprising a list acquisition unit is configured to determine whether the person who has directed his or her gaze to the display screen has viewed an advertisement to an end displayed on the display screen, wherein the display control unit is configured to cause the display device to display a list of advertisements for the determined category on the display screen if the list acquisition unit determined the person has viewed the advertisement to the end, and wherein the display control unit is configured to detect a person in front of the display screen of the display device while the content of an advertisement is displayed on the display screen, if the list acquisition unit determined the person has not viewed the advertisement to the end.

8. The display system according to claim 7, wherein the display control unit is configured to determine whether there has been a selection operation in which the person selected an advertisement from the list in a predetermined prior of time after the list of advertisements is displayed on the display screen, and wherein, if the display control unit determined that there has been the selection operation, the point giving unit gives points for the determined category to the advertisement selected, and the display control unit causes the display device to display the content of the advertisement selected.

9. A display system comprising:

detecting that a person has directed his or her gaze to a display screen of a display device that displays content;

determining, when the person has directed his or her gaze to the display screen, one or more categories on the basis of a result of estimating attributes of one or more persons included in an image captured within a visible range of the display screen of the display device that displays content;

giving points for a category to which a person who has viewed the content belongs, which is stored in a list information storage unit, on the basis of a viewing status of the content displayed on the display screen by the person;

setting, based on a fact that the gaze of the person is directed at the display screen, content being displayed when the gaze is directed as a target, and to give points for the category;

storing a point table which shows each identification information of a respective contents, each category and points given which are associated among each other;

generating a list of the content on the basis of the point tables for the category stored in the list information storage unit; and causing the display device to display a list of the content, which is generated according to the category based on a viewing tendency of the content.

\* \* \* \* \*